(12) United States Patent
Cantin et al.

(10) Patent No.: US 6,226,691 B1
(45) Date of Patent: *May 1, 2001

(54) SYSTEM, METHOD, AND ARTICLE OF MANUFACTURE FOR ADDING OBJECT SERVICES TO A BINARY CLASS IN AN OBJECT ORIENTED SERVER

(75) Inventors: Guylaine Cantin, Toronto (CA); George Prentice Copeland, Austin, TX (US); Geoffrey Martin Hambrick, Round Rock, TX (US); Roger Hereward Sessions, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/537,648

(22) Filed: Oct. 2, 1995

(51) Int. Cl.$^7$ .................................................. G06F 9/44
(52) U.S. Cl. ............................................................. 709/316
(58) Field of Search ........................... 395/685, 702, 395/700, 161, 683, 680; 709/310–332; 717/1–10

(56) References Cited

U.S. PATENT DOCUMENTS

| | | | |
|---|---|---|---|
| 5,093,914 | | 3/1992 | Coplien et al. .......................... 717/4 |
| 5,339,430 | * | 8/1994 | Lundin et al. ....................... 709/332 |
| 5,343,554 | | 8/1994 | Koza et al. ............................ 706/13 |
| 5,369,766 | * | 11/1994 | Nakano et al. ..................... 709/332 |
| 5,396,626 | * | 3/1995 | Nguyen .................................. 717/1 |
| 5,421,016 | * | 5/1995 | Conner et al. .......................... 717/7 |
| 5,465,362 | * | 11/1995 | Orton et al. ......................... 709/107 |

(List continued on next page.)

OTHER PUBLICATIONS

"Composition of Before/After Metaclasses in SOM," *Association of Computing Machinery, OOPSLA 94*, pp. 427–439, Oct. 1994.

"The Class Storage and Retrieval System: Enhancing Reusability in Object–Oriented Systems", OOPS Messenger, Apr. 6, 1995, No. 2, New York, Nelson et al, pp. 28–36.

"Composition of Before/After Metaclasses in SOM", ACM Sigplan Notices, vol. 29, No. 10, Oct. 1, 1994, Forman et al, pp. 427–439.

"Reflections on Metaclass Programming in SOM", ACM Sigplan Notices, vol. 29, No. 10, Oct. 1, 1994, Danforth et al, pp. 440–452.

(List continued on next page.)

*Primary Examiner*—St. John Courtenay, III
(74) *Attorney, Agent, or Firm*—David A. Mims, Jr.; Felsman, Bradley, Vaden, Gunter & Dillon, LLP

(57) ABSTRACT

A system, method and article of manufacture for automatically inserting object services such as persistence, concurrency, recoverability, security and distribution into binary classes in an information handling system employing object oriented technology, includes the steps of registering a description of a class in a name service context, searching the name service context for a class object referred to as a factory with desired constraints on properties, whether the object is operable in a predetermined operational environment, where the search excludes object services constraints, for classes which are found by the search, first select those classes which already support the object services constraints, create in the operational environment a class object with the desired object services features, and adding a particular object services feature if the original class provide the desired feature, and returning the class object to the caller which can then use the class object to create multiple instances thereof.

27 Claims, 4 Drawing Sheets

U.S. PATENT DOCUMENTS 5,473,777 * 12/1995 Moeller et al. .................. 709/328
5,493,680 * 2/1996 Danforth ............................ 717/2
5,581,761 * 12/1996 Radia et al. ........................ 717/2

OTHER PUBLICATIONS

The Common Object Request Broker:Architecture and Specification, Object Manangement Group and X Open, p. 123–142, 1992.*

M. Aksit, Jan Willem Dukstra, Anand Tripathi, Atomic Delegation Transactions, IEEE Software, p. 84–92, Mar. 1991.*

Joint Object Services, Submission Overview, OMG TC Document 93.7.1, pp. 19–26 & 45–52, Jul. 2, 1993.*

Composition of Before/After Metaclasses in SOM, Ira Forman, Scott Danforth, Hari Madduri, OPPSLA 94, p. 1–22, Oct. 1994.*

S. Danforth, I. Forman, "Reflections on Metaclass Programming SOM", OOPSLA '94, 00/00/94.*

R. Orfali, D. Harkey, Client/Server Programming with OS/2 2.1, third edition, van Nostrand Reinhold, pp. 987–989, 00/00/93.*

* cited by examiner

SYSTEM, METHOD, AND ARTICLE OF MANUFACTURE FOR ADDING OBJECT SERVICES TO A BINARY CLASS IN AN OBJECT ORIENTED SERVER

BACKGROUND OF THE INVENTION

1. Field of the Invention

The present invention relates to information handling systems, methods and articles of manufacture, and more particularly to information handling systems and methods for facilitating code reuse in an object oriented system.

2. Prior Art

In the prior art there are many techniques for improving object oriented programming systems (OOPS).

The following are examples of the prior art.

U.S. Pat. No. 5,093,914 generally teaches a method used by a digital computer in controlling execution of an object oriented program to effect a defined action, for example, stopping the program when a specified virtual function is invoked on a specified object during execution of the program.

Although the patent generally deals with methods for controlling execution of object oriented programs, the patent does not teach nor suggest automatically inserting object services into binary classes in an object oriented system as is taught and claimed herein with reference with the present invention.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patent deals generally with the use of object oriented systems including classes and sub-classes for solving problems, the patent does not teach nor suggest automatically inserting object services into binary classes in an object oriented system as is taught and claimed herein with reference with the present invention.

There is a need to automatically add object services features, for example, persistence, recoverability, concurrency and security to a binary class. Sometimes the source code of a class is not available for modification. Even when the source code is available, a considerable reprogramming effort is required to add the object services features.

A user should be able to add object services features in a way that does not increase the size of the users class diagram with many variations on the original class. The user should be able to specify these object services features as constraints along with constraints that describe the function of the class when searching for the class.

An overall goal in object oriented programming systems is the development of program objects which can be reused easily.

The importance of binary code over source code increases with the degree of reuse. A main purpose of object oriented technology is code reuse. For object oriented technology to achieve large scale success, binary code reuse is essential. As the state of the art moves towards applications built from object formats which can be tailored and plugged into each other, binary code is critical.

The Object Management Group is currently defining a set of interfaces for object system services named Common object Services.

SUMMARY OF THE INVENTION

It is an object of the present invention to automatically insert object services such as persistence, concurrency, recoverability, security and distribution into binary object classes.

Accordingly, a method for automatically inserting object services such as persistence, concurrency, recoverability, security and distribution into binary classes in an information handling system employing object oriented technology, includes the steps of registering a description of a class in a name service context, searching the name service context for a class object referred to as a factory with desired constraints on properties, whether the object is operable in a predetermined operational environment, where the search excludes object services constraints, for classes which are found by the search, first select those classes which already support the object services constraints, create in the operational environment a class object with the desired object services features, adding a particular object services feature if the original class does not provide the desired feature, and returning the class object to the caller which can then use the class object to create multiple instances thereof.

It is an advantage of the present invention that no reprogramming effort is required for insertion of object services, source code is not required and, in fact, is not desired, and the user's class diagram and library do not increase in complexity or size.

DETAILED DESCRIPTION OF A PREFERRED EMBODIMENT OF THE INVENTION

Figure 1:
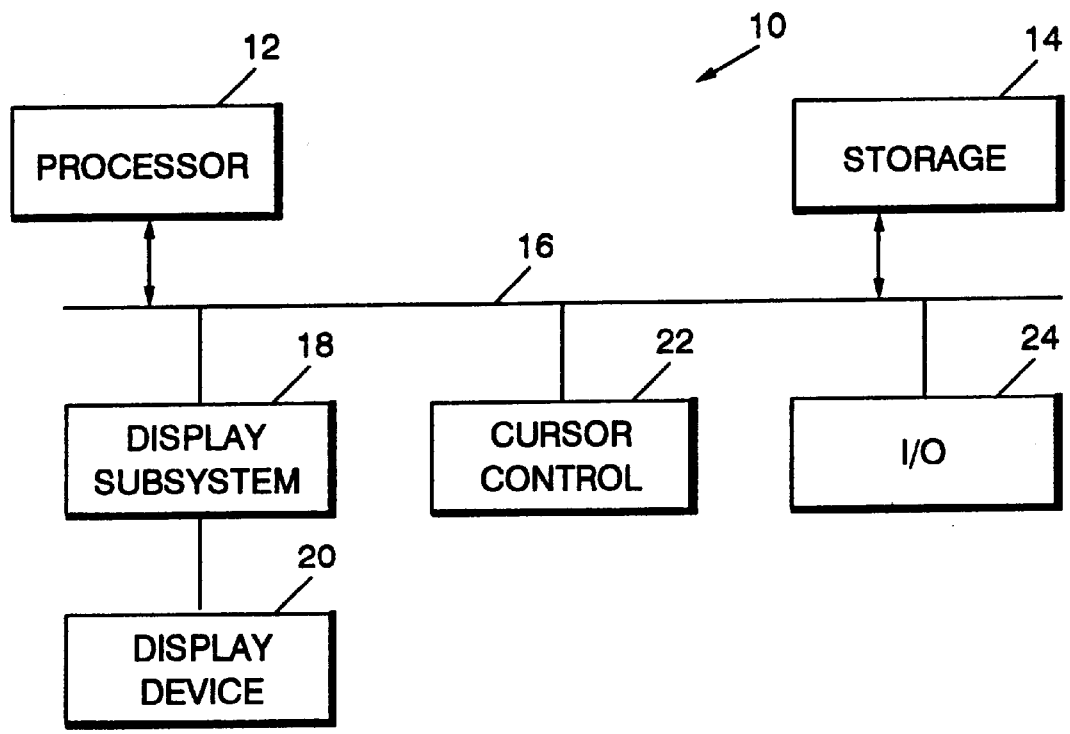
FIG. 1 is a block diagram of a system for executing the method according to the present invention.
Figure 2:
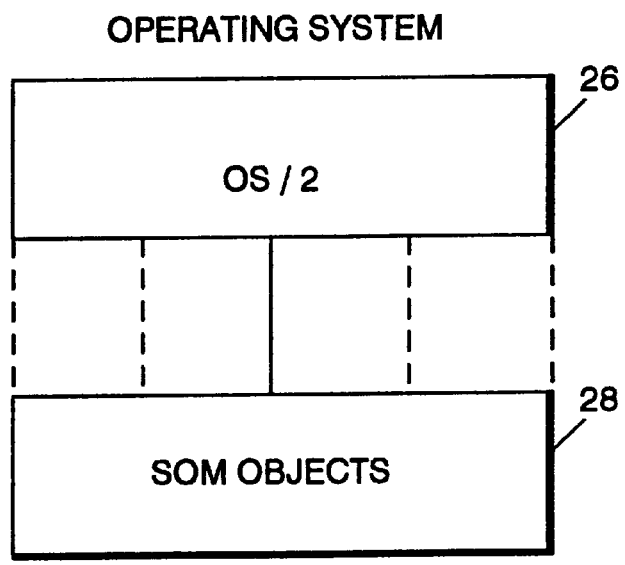
FIG. 2 is a block diagram showing the operating system platform and system object model program supporting the present invention.

Referring now to FIGS. 1 and 2, an information handling system 10 and an operating system environment for the present invention will be described.

Information handling system 10 may be a graphics work station or the like with a very powerful processor 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multitasking operating system such as OS/2 26 (OS/2 is a registered trademark of International Business Machines Corporation). Among many tasks which the OS/2 operating system 26 controls in operating information handling system 10, is execution of a program SOMObjects 28, which is a commercially available product of International Business Machines Corporation.

The method and article of manufacture of the present invention may be incorporated in the SOMObjects program 28.

The object services supported by the object platform include the following:

Externalization, which is a technique for moving data into and out of an object for purposes such as copying an object across address bases, moving an object across address bases, caching an object in a client address base, passing an object by value across address bases or storing and restoring objects persistent state;

Persistence allows an object's state to be stored into a datastore mechanism such as a database or file system.

Figure 4:
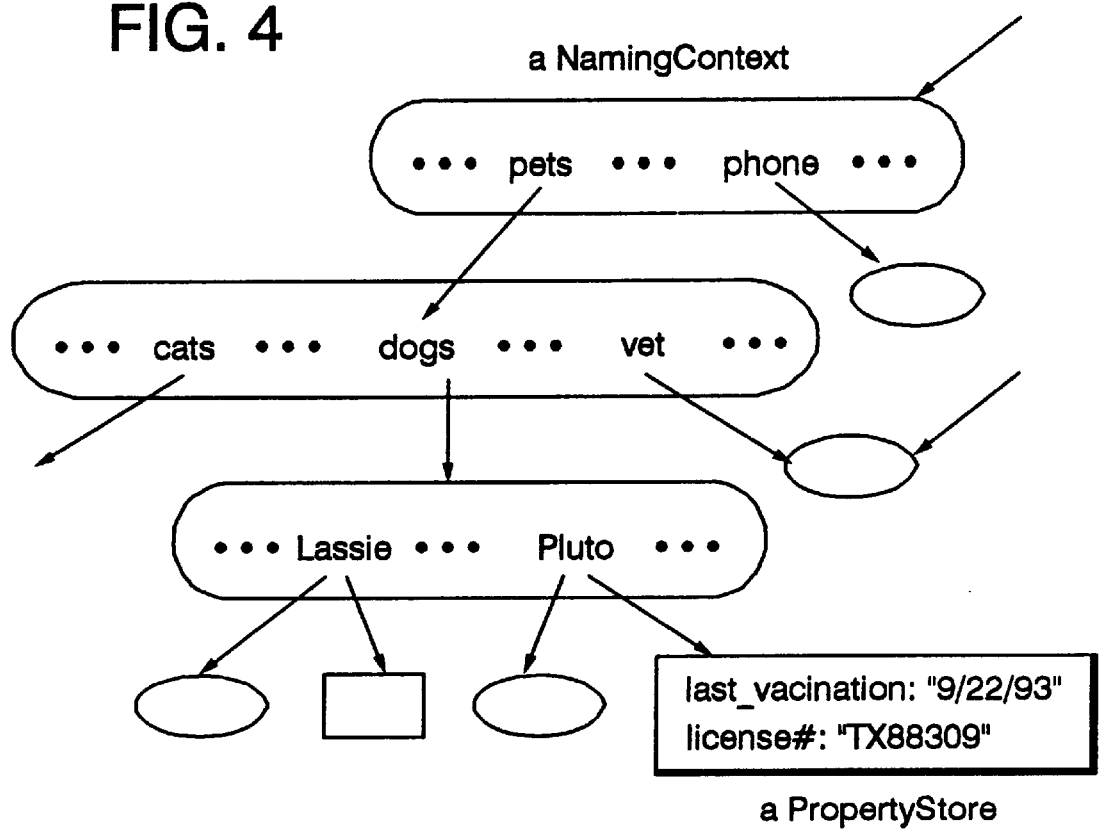
FIG. 4 is a block diagram of an object name service in accordance with the present invention.
Figure 5:
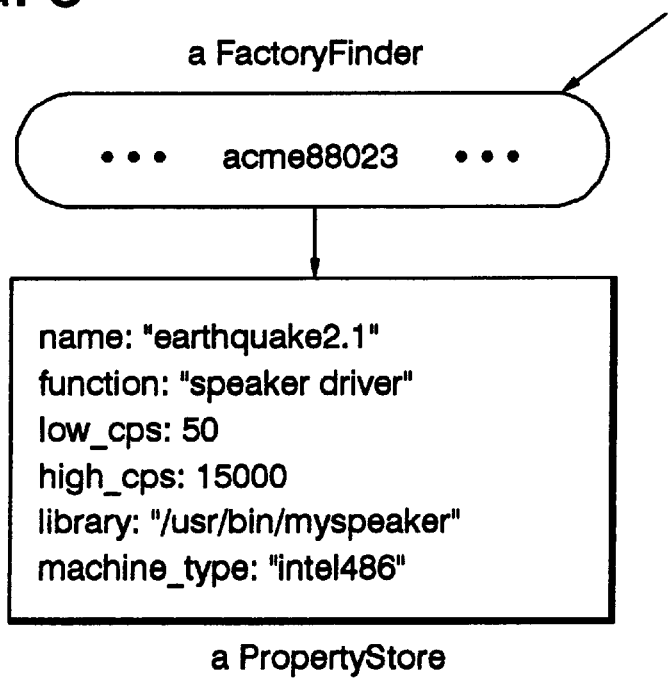
FIG. 5 is a block diagram of a factory finder naming context example in accordance with the present invention.

Object transaction service provides a two-phase commit coordination among recoverable objects, where the transaction service is responsible for passing the transaction context between a caller and a callee, reliably accepting registration of recoverable resources, and coordinating two-phase commitment;

Concurrency service provides a lock manager which controls locks on behalf of either transactions or threads, where in dealing with transaction locks the concurrency handles locks inheritance for nested transactions and supports explicit locking and unlocking for applications where lock contention is a bottleneck;

object name service (See FIG. 4) allows an object to be bound to a directory (a naming context) with a human friendly name;

A special case of the object name service is a factory finder (See FIG. 5), wherein a class description can be bound to a directory along with properties describing class, including functional features, class library, cost, instruction set type, etc.

To support binary class reuse, the contract between the following two human roles must be addressed:

The object provider designs the class external interface, implements its methods and packages it as a product including its IDL (interface definition language) description of the external interface and its DLL (dynamic link library) containing its binary code.

The object consumer buys the above binary object and adapts it for use in his application. This includes, among other things, adding whatever object services necessary.

Object services are supported by the object platform (e.g., SOM). However, the binary class must cooperate with the object platform to enable these object services to be applied to the binary class. This requires some work by both the object provider and consumer. This invention minimizes the work required by both of these human roles.

In accordance with the present invention, the object provider adds the following in the binary class IDL and DLL:

An external data schema for the object that includes the external view of all data needed for the object's methods to work correctly.

The externalize_to_stream( ) and internalize_from stream( ) methods that move data out of and into the object.

This is used in conjunction with the Externalization Service to move or copy an object, caching an object in a client address space, pass an object by value, store/restore an object's persistent state from/to a datastore, object query, recoverability, initialization, export/import, and other object services.

The object provider may also provide a method to check the consistency of the object, which is called during the transaction commit process. The object provider usually does nothing else to provide object services.

In accordance with the present invention, the object consumer requests the object platform to add various object services to the binary class, producing a new class that fits more precisely into the object consumer's application. The enhancements to the binary class to facilitate object services include (but limited to) the following:

Making the object recoverable, so it can participate in a transaction involving multiple recoverable objects coordinated the two-phase commit process of the Transaction Service. This includes registering the object with the transaction manager of the Transaction Service in a before method.

Making the object concurrent, so that multiple users of the object can be serialized correctly. This involves getting a lock on the object using the Concurrency Service in a before method.

Making the object persistent, so that its state can be saved in a datastore at commit and later restored to where it was earlier in a before method. If a database schema exists where the object's data is to be stored, the object consumer provides a schema mapping between the object's external data schema and the database schema.

Making the object secure, so that object/method granularity access control can be enforced. This involves checking access control in a before method.

In general, it is expected that the class provider, the entity which provides the abstracted data type referred to herein as a class, will construct the class without concern for object services. When a user wants an instance of a class, the combination of desired services are specified. A new binary class is constructed from the original which adds the desired object services.

Two mechanisms are employed in accordance with the present invention to accomplish the automatic insertion of object services.

First, a new class (sub-class) is created by mixing in the original class and a special class that provides the additional function.

Next, a BeforeAfter metaclass (See FIG. 6) inserts a method before and a method after the methods of the original class.

As an example, if a user desires a concurrent, persistent and recoverable version of class A, to each of class A's original methods, the following needs to be added:

1. The before method ensures the object is locked;
2. The before method ensures the object is registered as a recoverable resource with the transaction manager;
3. The before method ensures that the object's state is loaded from its datastore if its state is out of date If information is available which indicates whether the method is read only, the above identified before methods can be optimized. The following methods also must be added:

4. Pre-prepare: Store the object's state in its datastore.
5. Prepare: Call the object's method for checking integrity constraints.
6. Commit: Mark that the object's state as out of date and release locks.
7. Abort: Mark that the object's state as out of date and release locks.

The object services constraints that are specified as part of the predicate when a factory is found in a Name Service (NS) ExtendedNamingContext (ENC) for factories are:

name: persistent value: A boolean indicating whether the object should be persistent, which means that the object's state can be saved and later brought back to where it was even if the object's server goes away.

name: PO
value: If persistent==TRUE, a boolean indicating whether the PersistentObject (PO) interface is wanted.
name: recoverable
value: A boolean indicating whether the object is recoverable, which means that it can participate in transactional two-phase commit.
name: concurrent
value: A boolean indicating whether the object is locked.
name: secure
value: A boolean indicating whether the object is protected by access control checking.
name: caching
value: A boolean indicating whether the object's state can be cached within its ORB proxies.

The location constraint that is specified as part of the predicate when a factory is found in a NS ENC for single-class factories is:

name: InstanceManager
value: The caretaker of the object, which provides the object's identity, its activation, caching in memory, etc.

Information about whether an IDL operation on an object might update its persistent state can allow a significant optimization for some implementations of persistence, concurrency control and recoverability. For persistence, this can be used to determine whether the method is going to make the object's persistent state out of sync with that in its datastore. For concurrency, this can be used to determine whether to get a read or write lock before allowing the operation to be executed. For recovery, this can be used to determine whether to make a copy of the object's state before allowing the operation to be executed. This information should be stored in the IR. The per IDL operation option is:

name: CONST
value: A boolean indicating whether the operation may update the object's state. The default is FALSE (may update). This information should be stored in the IR.

Figure 3:
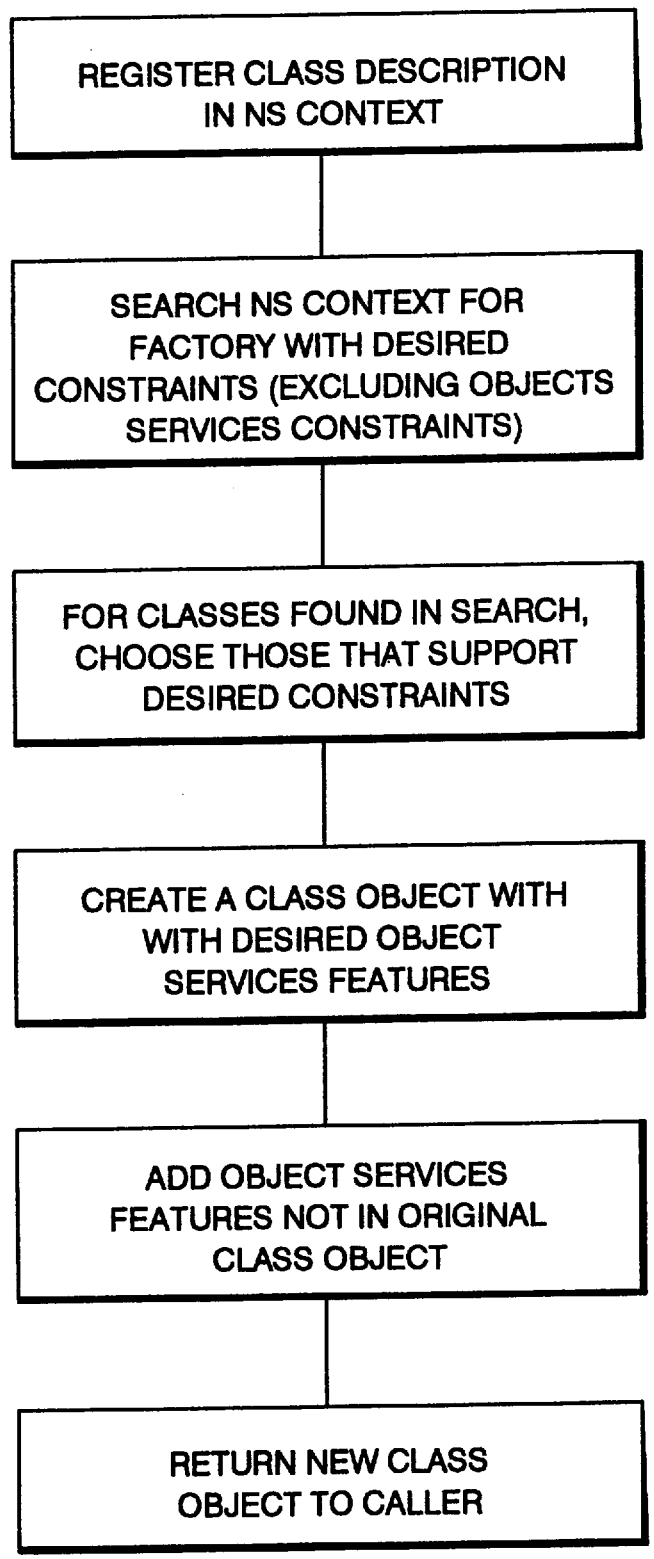
FIG. 3 is a flow chart of the method in accordance with the present invention.

Referring now to FIG. 3, the method according to the present invention will be described.

A class description is registered in a name service (NS) context. This description typically includes a description of the class' function, for example a speaker driver, its characteristics, for example output frequency is 10 CPS, its cost, what object services features are already supported, what processor type it is compiled for, for example Intel X86, and the file name for its load module.

Next, a search is made of the name service context for a factory with the desired constraints on properties, for example a speaker driver that can provide an output to a frequency less than 20 CPS and a cost of less than $5.00. The search would also include a determination of whether the object can run in the machine where the object's InstanceManager lives, for example, Intel X86 binary. Object services constraints such as persistent and recoverable would be excluded from the search.

For classes that are found in the above search, a first selection is made of those classes which already support the object services constraints. Next, a class object is created in a desired server with the desired object services features such as persistent and recoverable. If a particular object services feature is provided in the original class, no action is taken. However, if the feature is not provided, it is added to the new class object.

Lastly, the new class object is returned to the caller who then can use it to create multiple instances of the class.

Many of the object services features can be provided by mixing the original class with the newly created class. Using run time inheritance, the original class' implementation may be overridden by the newly created class. The creation of the new class object with the desired properties can be accomplished in a manner that is transparent to the user.

Figure 6:
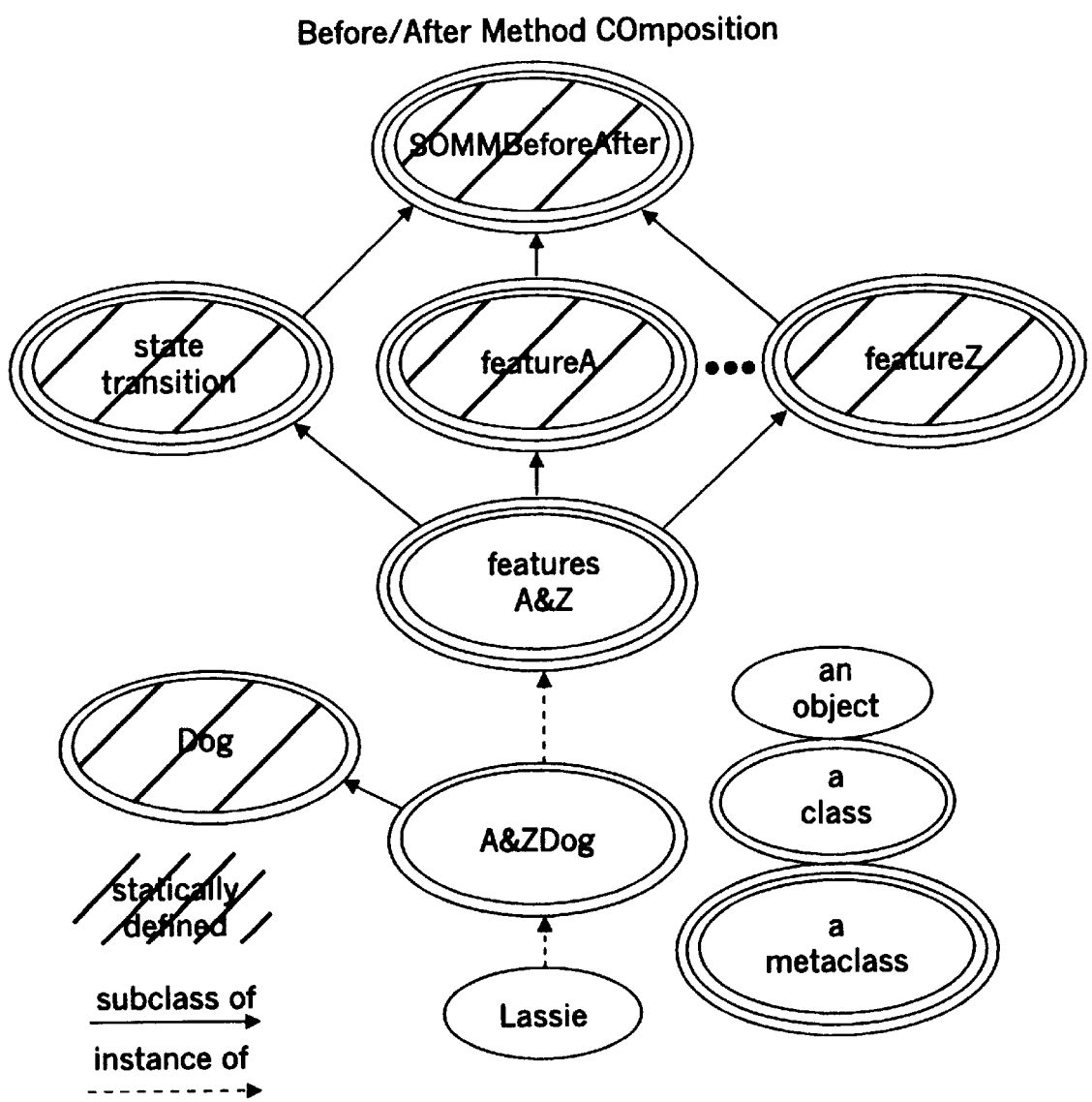
FIG. 6 is an object diagram showing the use of a BeforeAfter metaclass for providing object services features in accordance with the present invention.

Many of the OS features can be provided by using the BeforeAfter metaclass as illustrated in FIG. 6. A metaclass can be created as a subclass of BeforeAfter with the before and after methods overridden. A class with this new metaclass has the before method and after method executed before and after each method of the class. A single pair of before/after methods is driven by a usage object that describes what object services to add.

For object systems that do not support inheritance and before/after metaclasses, a delegate class can be automatically constructed instead. The delegate class instance object references the original class instance object. The delegate class has the same additional methods added that were described above (e.g., preprepare, prepare, commit, abort). The delegate class also supports all of the operations of the original class but implements each method as follows:

```
DelegateClass : : methodA ( . . . ) {
    before method work;
    OriginalClass_instance_object->methodA ( . . . );
    after method work;
}
```

It will be appreciated that although a specific embodiment of the present invention has been described herein for the purposes of illustration, various modifications may be made without departing from the spirit or scope of the invention. Accordingly, the scope of this invention is limited only by the following claims and their equivalents.

What is claimed is:

1. A data processing system, comprising:

a processor and a memory in communication with said processor;

a binary class object stored in said memory, said binary class object having properties including a functional description summarizing an intended purpose of said binary class object, one or more inherent characteristics, and support for zero or more object services features;

an ExtendedNamingContext factory finder having at least one entry registered therein, wherein said entry associates said binary class object with said functional description, a description of each of said one or more inherent characteristics, and a description of each of said zero of more object services features;

a factory filter for accepting a request for a new class object, wherein said request includes specified constraints on properties, said specified constraints including a functional description summarizing an intended purpose of said binary class object, a description of at least one inherent characteristic of said new class object, and a description of at least one object services feature to be supported by said new class object, and for identifying all binary class objects registered in said ExtendedNamingContext factory finder matching said specified functional description and said specified description of at least one inherent characteristic;

a feature filter for determining whether at least one of said identified binary class objects supports all of said specified object services features; and an automatic class builder for automatically forming said new class object with said specified constraints on properties and providing said new class object in response to said request, wherein:

said automatic class builder associates said new class object with a particular binary class object among said identified binary class objects if said particular binary class object supports all of said specified object services features, and, if no identified binary class object supports all of said specified object services features, said automatic class builder selects a particular binary class object among said identified binary class objects and adds to said selected binary class object support for object services features specified in said request and not supported by said selected binary class object.

2. A data processing system according to claim 1, wherein:

said data processing system further comprises an interface definition language (IDL) definition for said binary class object; and said request for a new class object is processed by obtaining information from said IDL definition and not from source code for said binary class object.

3. A data processing system according to claim 1, wherein said automatic class builder forms said new class object by combining said selected binary class object with one or more class objects that support object services features described in said request and not supported by said selected binary class object.

4. A data processing system according to claim 1, wherein:

said selected binary class object includes one or more preexisting methods; and said automatic class builder forms said new class object by adding at least one first method to be executed before execution of at least one of said one or more preexisting methods.

5. A data processing system according to claim 1, wherein said new class object is automatically formed as a delegate class, wherein said delegate class references said selected binary class object.

6. A data processing system according to claim 1, wherein:

said properties of said binary class object include a location for said binary class object; and said at least one entry associates said location for said binary class object with said functional description, said description of each of said one or more inherent characteristics, and said description of each of said zero or more object services features.

7. A data processing system according to claim 4, wherein said automatic class builder forms said new class object by adding at least one second method to be executed after execution of at least one of said one or more preexisting methods.

8. A data processing system according to claim 4, wherein said at least one first method conditionally prevents at least one of said one or more preexisting methods from executing.

9. A data processing system according to claim 4, wherein said automatic class builder forms said new class object by combining said selected binary class object with one or more BeforeAfter metaclass objects.

10. In an information handling system employing object oriented technology, a method for automatically supplementing a binary class object with at least one object services feature, the method comprising the steps of:

providing a binary class object having properties including a functional description summarizing an intended purpose of said binary class object, one or more inherent characteristics, and support for zero or more object services features;

providing an ExtendedNamingContext factory finder having at least one entry registered therein, wherein said entry associates said binary class object with said functional description, a description of each of said one or more inherent characteristics, and a description of each of said zero or more object services features;

receiving a request for a new class object having specified constraints on properties, said specified constraints including a functional description summarizing an intended purpose of said new class object, a description of at least one inherent characteristic of said new class object, and a description of at least one object services feature to be supported by said new class object;

searching the ExtendedNamingContext factory finder to identify all registered binary class objects associated with said specified functional description and said specified description of at least one inherent characteristic;

determining whether at least one of said identified binary class objects supports all of said specified object services features;

automatically forming said new class object with said specified constraints on properties by associating said new class object with a particular binary class object among said identified binary class objects if said particular binary class object supports all of said specified object services features, and, if no identified binary class object supports all of said specified object services features, by selecting a particular binary class object among said identified binary class objects and by adding to said selected binary class object support for object services features specified in said request and not supported by said selected binary class object; and providing said new class object in response to said request.

11. A method according to claim 10, wherein:

said step of providing a binary class object further comprises the step of providing an interface definition language (IDL) definition for said binary class object; and said binary class object is supplemented with said at least one object services feature by obtaining information from said IDL definition and not from source code for said binary class object.

12. A method according to claim 10, wherein said step of automatically forming said new class object comprises the step of combining said selected binary class object with one or more class objects that support object services features described in said request and not supported by said selected binary class object.

13. A method according to claim 10, wherein:

said selected binary class object includes one or more preexisting methods; and said step of automatically forming a new class object comprises the step of adding at least one first method to be executed before execution of at least one of said one or more preexisting methods.

14. A method according to claim 10, wherein said new class object is automatically formed as a delegate class, wherein said delegate class references said selected binary class object.

15. A method according to claim 10, wherein:

said properties of said binary class object include a location for said binary class object; and said at least one entry associates said location for said binary class object with said functional description, said description of each of said one or more inherent characteristics, and said description of each of said zero or more object services features.

16. A method according to claim 13, wherein said step of automatically forming a new class object further comprises the step of adding at least one second method to be executed after execution of at least one of said one or more preexisting methods.

17. A method according to claim 13, wherein said at least one first method conditionally prevents at least one of said one or more preexisting methods from executing.

18. A method according to claim 13, wherein said step of automatically forming said new class object further comprises the step of combining said selected binary class object with one or more BeforeAfter metaclass objects.

19. A program product that automatically adds one or more object services features to a binary class object having a plurality of properties including a functional description summarizing an intended purpose of said binary class object, one or more inherent characteristics, and support for zero or more object services features, said program product comprising:

an ExtendedNamingContext factory finder having at least one entry registered therein, wherein said entry associates said binary class object with said functional description, a description of each of said one or more inherent characteristics, and a description of each of said zero of more object services features;

a factory filter for accepting a request for a new class object, wherein said request includes specified constraints on properties, said specified constraints including a functional description summarizing an intended purpose of said new class object, a description of at least one inherent characteristic of said new class object, and a description of at least one object services feature to be supported by said new class object, and for identifying all binary class objects with entries in said ExtendedNamingContext factory finder matching said specified functional description and said specified description of at least one inherent characteristic;

a feature filter for determining whether at least one of said identified binary class objects supports all of said specified object services features;

an automatic class builder for automatically forming said new class object with said specified constraints on properties and providing said new class object in response to said request, wherein:

said automatic class builder associates said new class object with a particular binary class object among said identified binary class objects if said particular binary class object supports all of said specified object services features, and, if no identified binary class object supports all of said specified object services features, said automatic class builder selects a particular binary class object among said identified binary class objects and adds to said selected binary class object support for object services features specified in said request and not supported by said selected binary class object; and a computer usable medium encoding said ExtendedNamingContext factory finder, said factory filter, said feature filter, and said automatic class builder.

20. A program product according to claim 19, wherein:

said program product further comprises an interface definition language (IDL) definition for said binary class object encoded in said computer usable medium; and said request for a new class object is processed by obtaining information from said IDL definition and not from source code for said binary class object.

21. A program product according to claim 19, wherein said automatic class builder forms said new class object by combining said selected binary class object with one or more class objects that support object services features described in said request and not supported by said selected binary class object.

22. A program product according to claim 19, wherein:

said selected binary class object includes one or more preexisting methods; and said automatic class builder forms said new class object by adding at least one first method to be executed before execution of at least one of said one or more preexisting methods.

23. A program product according to claim 19, wherein said new class object is automatically formed as a delegate class, wherein said delegate class references said selected binary class object.

24. A program product according to claim 19, wherein:

said properties of said binary class object include a location for said binary class object; and said at least one entry associates said location for said binary class object with said functional description, said description of each of said one or more inherent characteristics, and said description of each of said zero or more object services features.

25. A program product according to claim 22, wherein said automatic class builder forms said new class object by adding at least one second method to be executed after execution of at least one of said one or more preexisting methods.

26. A program product according to claim 22, wherein said at least one first method conditionally prevents at least one of said one or more preexisting methods from executing.

27. A program product according to claim 22, wherein said automatic class builder forms said new class object by combining said selected binary class object with one or more BeforeAfter metaclass objects.

* * * * *